United States Patent [19]

Schwartz et al.

[11] 3,929,947
[45] Dec. 30, 1975

[54] PROCESS FOR MANUFACTURING WALLBOARD AND THE LIKE

[75] Inventors: Murray Arthur Schwartz, Tuscaloosa; Thomas Oscar Llewellyn, East Tuscaloosa, both of Ala.

[73] Assignee: The United States of America as represented by the Secretary of the Interior, Washington, D.C.

[22] Filed: Aug. 8, 1974

[21] Appl. No.: 495,486

[52] U.S. Cl. .......... 264/42; 264/DIG. 5; 264/46.3; 264/54; 264/254; 264/257; 264/261; 264/332; 156/39; 106/109
[51] Int. Cl.² .. B29H 7/20; B29H 9/02; B22B 31/06
[58] Field of Search ........ 106/70, 109, 110; 264/42, 264/46.2, 254, 257, 261, 332, 46.3, 54, DIG. 5; 156/43, 39

[56] References Cited
UNITED STATES PATENTS
273,527   3/1883   Herbert ............................... 106/70

| 1,547,666 | 7/1925 | Pickard et al. ...................... 106/70 |
| 3,337,355 | 8/1967 | Dale et al. ......................... 106/70 |
| 3,787,276 | 1/1975 | Jacquelin ........................... 156/205 |
| 3,870,588 | 3/1975 | Yamamoto .......................... 264/42 |

FOREIGN PATENTS OR APPLICATIONS
1,805   7/1856   United Kingdom .................. 106/70

*Primary Examiner*—Patrick P. Garvin
*Assistant Examiner*—John P. Sheehan
*Attorney, Agent, or Firm*—William S. Brown; Donald R. Fraser

[57] ABSTRACT

A process for manufacturing wallboard and the like comprising a basic composition of sulfur and gypsum wherein sulfur is foamed by the vaporization of the water contained in the gypsum, thereby producing a stable foam that may be compressed under pressure between sheets of wallboard covering material.

4 Claims, 4 Drawing Figures

PROCESS FOR MANUFACTURING WALLBOARD AND THE LIKE

BACKGROUND OF THE INVENTION

1. Field of the Invention

The present invention relates to new and useful improvements in the manufacturing of wallboard, lightweight panels and related building materials. In particular, the present invention relates to such materials which comprise gypsum as an ingredient in their compositions and wherein such building materials are made by molding gypsum-containing compositions under pressure between sheets of covering material in order to produce a desired structural building component in the form of a flat wallboard or panel.

2. Description of the Prior Art

The prior art is replete with processes and compositions for manufacturing wallboards, lightweight panels and related materials from various mineral compositions. Such compositions normally comprise gypsum, a calcium sulfate compound having the usual formula of $CaSO_4 \cdot 2H_2O$. The gypsum is normally the primary ingredient which is mixed with various inert materials such as clay and the like. These compositions are molded under pressure between sheets of paper or similar covering material in order to form a flat panel-like structure.

Heretofore known prior art wallboards, panels and the like are extremely fragile because of the characteristic brittleness of the compositions utilized in their formation. They must be handled with extreme care when moved into place during construction procedures. Further, the powdery compositions of such prior art panels do not permit the secure fastening of nails or screws therein for the purpose of attaching the panels to support structures. The covering sheets, normally paper or similar material, which sandwich these compositions to form a laminate body, are usually not capable of being securely adhered to the primarily gypsum composition in order to achieve maximum strength.

SUMMARY OF THE INVENTION

The present invention overcomes the disadvantages and difficulties inherent with heretofore known prior art processes and compositions for gypsum wallboard by utilizing a wallboard composition comprised mainly of sulfur along with a relatively minor proportion of gypsum. Viscosity increasing agents and inert materials may also be included in the basic composition. The instant process is characterized by first melting the sulfur and mixing the viscosity increasing agents and inert materials therewith. Gypsum, in the form of a hydrate, i.e. $CaSO_4 \cdot 2H_2O$, is added to the mixture such that the gypsum loses much of its water content by vaporization, thereby transforming the gypsum into its hemihydrate form, i.e. $CaSO_4 \cdot \frac{1}{2}H_2O$. This rapid vaporization of water results in foaming of the sulfur as the water vapor rapidly escapes from the hot mixture. This in turn creates a stable foam product which may then be cast or molded under pressure between suitable sheets of wallboard covering material to form a laminate having the desired structural thickness. The finished wallboard panel is then cooled to effect complete solidification of the foamed composition. It is therefore an object of the present invention to provide a process for manufacturing a wallboard panel that is light in weight and having an improved physical strength.

It is another object of the present invention to provide a process for manufacturing a wallboard panel having an improved acceptance of nails, screws and related fastening means.

It is still another object of the present invention to provide for an improved wallboard panel which is capable of being manufactured in larger and thinner sizes because of its inherent high strength and low weight characteristics.

It is a further object of the present invention to provide for a wallboard that resists moisture absorption and possesses improved thermal and acoustical insulation qualities.

BRIEF DESCRIPTION OF DRAWINGS

Other objects and advantages of the present invention will be apparant from the following description, when read in connection with the accompanying drawings, in which.

DESCRIPTION OF THE PREFERRED EMBODIMENTS

The basic procedure of the present invention comprises melting a batch of sulfur at a temperature range of approximately 130° – 155°C. Viscosity increasing agents, such as $P_2S_5$ and styrene, may be added and permitted to react with the molten sulfur. Also, flame retardants, such as dicyclopentadiene and the like may also be added to the reacting mixture. Inert materials such as talc or clay may also be added and thoroughly mixed with the molten sulfur mixture. Gypsum, $CaSO_4 \cdot 2H_2O$ is added last to the hot sulfur mixture with rapid mixing or agitation of the entire composition. At the temperature of the molten mixture, the gypsum loses approximately 75% of it's water and transforms to the hemihydrate form, i.e. $CaSO_4 \cdot \frac{1}{2} H_2O$. The water is rapidly vaporized into a gaseous state which produces foaming of the entire melt. The resulting stable foam produced is then molded under pressure to form the wallboard panel structure. The foamed sulfur achieves almost instantaneous maximum strength on cooling from the melt fabrication temperature of approximately 130° – 155°C. By contrast, prior art gypsum composition wallboards require much longer periods of time to set and cure in order to achieve their maximum strength.

The composition utilized in the present invention process is basically all sulfur with only a very small percentage of gypsum added to achieve foaming of the sulfur melt. The amount of gypsum utilized is not critical, the only criteria being of sufficient quantity so as to achieve foaming of substantially the entire sulfur melt. The viscosity increasing agents, inert materials and flame retardants may also be included in varying small quantities to achieve the desired cumulative result of their known qualities.

An example of a typical composition which can be employed in the process of the present invention though by no means limiting thereto, is as follows:

|  | Parts by Weight |
| --- | --- |
| Sulfur | 200 |
| $P_2S_5$ | 6 |
| Styrene | 6 |
| Talc | 15 |
| Gypsum | 5.5 |

Because of the small percentage of gypsum needed to achieve the required foaming of the sulfur and the extreme efficiency of the foaming reaction, it is not necessary to use pure gypsum. In fact, for economic considerations, waste gypsum is quite adequate for achieving the desired results.

Since sulfur normally possesses excellent adhesive qualities, the use of this element as the primary ingredient for the practice of the instant process permits the utilization of a wide variety of wallboard covering materials in addition to the usual paperlike coverings. Such flexibility in choice of coverings is not possible with prior art gypsum wallboards because of their very poor adhesive qualities, notwithstanding the use of pressure molding techniques.

Figure 1:
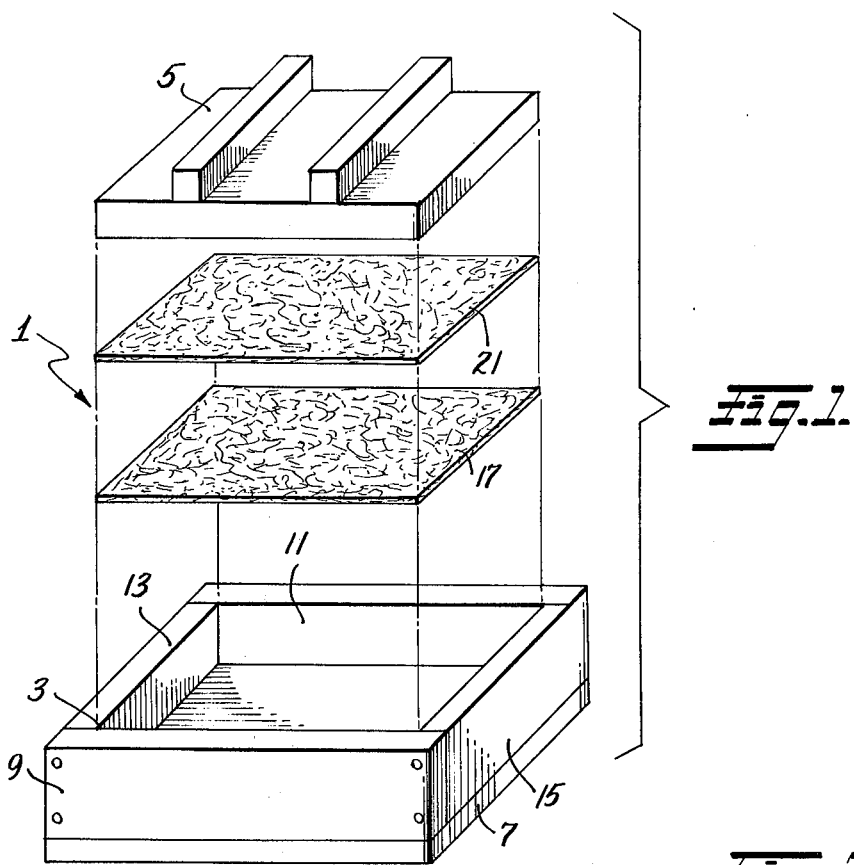
FIG. 1 is an exploded perspective view of one embodiment of the type of molding apparatus which can be utilized to practice the method of the present invention.
Figure 2:
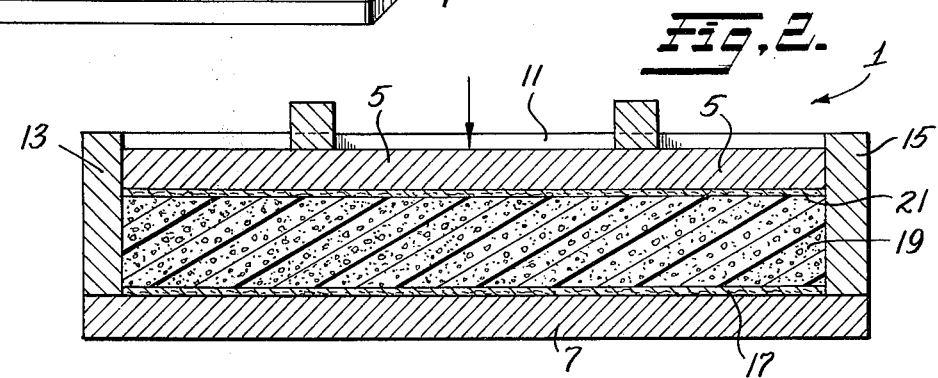
FIG. 2 is a front elevational view, taken in cross section, of the mold of FIG. 1 in its assembled condition.

The process of the present invention can be practiced in either a batch manner or in a continuous manner. Referring first to FIGS. 1 and 2, there is depicted an embodiment of the type of apparatus which can be utilized to form individual wallboard panels by the present process in a batch manner. A mold assembly 1 includes a lower box section 3 containing the mold cavity and a top press section 5 which telescopically fits within the cavity of lower section 3. Section 3 includes a flat bottom 7 and a plurality of vertical wall sections 9,11,13 and 15. In use, a wallboard covering sheet 17, of paper or other material, is laid in the mold cavity of lower section 3 on top of flat bottom 7. The stable foam composition 19, prepared as previously indicated above, is then placed into the mold cavity on top of sheet 17 and a second sheet of wallboard covering 21 is placed over the foam. By applying downward pressure with section 5 against the upper sheet covering 21, the foam 19 is caused to be compressed into the desired final panel thickness and forms a laminate with covering sheets 17 and 21 which are securely adhered to the opposite sides of the stable foam body 19.

Figure 3:
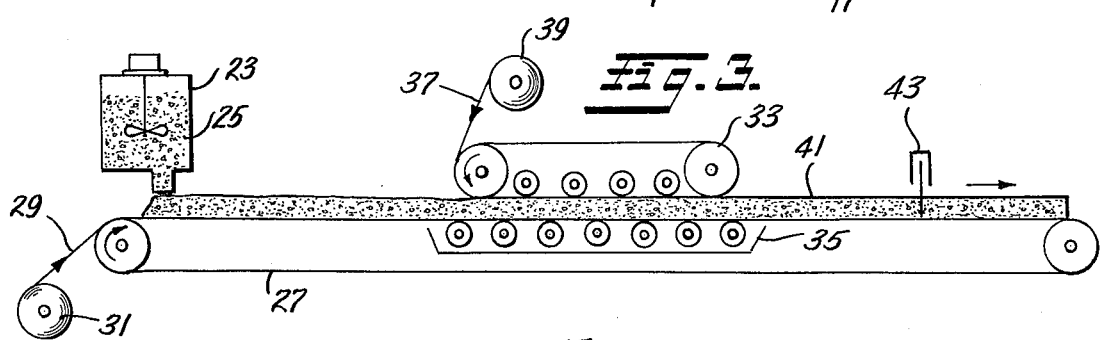
FIG. 3 is a schematic representation of another embodiment of the type of apparatus which can be utilized to practice the method of the present invention.

FIG. 3 depicts a system for practicing the method of the present invention wherein the wallboard panels are produced in a continuous manner. A hopper 23 maintains a supply of the stable foam 25 which is fed onto a conveyor 27 which is initially provided with a moving layer of wallboard covering material 29 which is fed from supply roll 31. The foam 23 fed onto covering sheet 29 is then passed between an upper pressure platen 33 and a lower pressure platen 35. Platens 33 and 35 may be in the form of rollers, conveyers or other suitable pressure applying means well known in the prior art. A suitable system is that shown by Delaney U.S. Pat. No. 1,890,674. A second sheet of covering material 37 is fed from a second supply roll 39 and serves to cover the upper portion of stable foam 23 just prior to the pressure treatment between platens 33 and 35. Compressed to the desired thickness and laminated between the coverings 29 and 37, the assembled wallboard structure 41 is then conveyed to a cutter means 43 which divides the continuously formed wallboard into sections of predetermined sizes.

Figure 4:
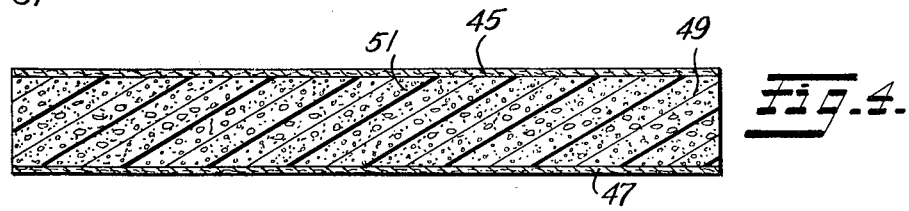
FIG. 4 is a cross sectional view of the wallboard panel produced by the method of the present invention.

The basic structure of the improved wallboard panel produced by the process of the present invention is shown in FIG. 4. Outer sheet coverings 45 and 47 are securely adherred to the foamed inner core composition 49. As noted, core 49 is characterized by a multitude of voids or pores 51 produced by the rapid vaporization of the water contained in the gypsum composition. As seen in FIG. 4, pores 51 are largest in the middlle portion of the core 49 and gradually deminish in size towards the outer surfaces where the core 49 is laminated to covering sheets 45 and 47. This variation in density is due to the higher degrees of pressure experienced at the surfaces of the composition during the pressure application of the covering sheets when the foam is being compressed. During the manufacture of the wallboard, the application of pressure serves to securely attach the outer covering 45 and 47 to the stable foam composition 49 while the latter is still in an adhesive state. As such, the dense outer surfaces produced provide a high degree of smoothness and secure acceptance of nails and other fastening means as desired in a wallboard panel structure, while the high internal porosity provides low density and high degrees of thermal and acoustical insulation.

It is to be understood that numerous and extensive departures or modifications may be made from the invention as described without departing from the spirit and scope of the invention as limited only by the following claims:

We claim:

1. A process for making porous wallboard panels and related porous building materials comprising the steps of:
  a. providing a major quantity of molten sulfur at a temperature of about 130° to 155°C,
  b. adding a minor amount of gypsum $CaSO_4.2H_2O$, to the molten sulfur in sufficient quantity such that the water in the gypsum vaporizes, thereby transforming the gypsum into hemihydrate form, $CaSO_4.\frac{1}{2}H_2O$, thus causing foaming of substantially the entire quantity of molten sulfur,
  c. forming the foamed sulfur under pressure into the desired panel shape, and
  d. cooling the formed panel.

2. The process of claim 1 further including the step of adding a viscosity increasing agent from the group consisting of $P_2S_5$ and styrene and an inert material from the group consisting of talc and clay to the molten sulfur prior to the addition of gypsum.

3. The process of claim 1 wherein the foamed sulfur is formed under pressure between two sheets of covering material which become adhesively laminated to the formed panel after the cooling thereof.

4. The process of claim 1 wherein the formed panel increases in density from the entire central portion thereof towards the respective outer surface areas.

* * * * *